US007377214B2

(12) United States Patent
Schomisch et al.

(10) Patent No.: US 7,377,214 B2
(45) Date of Patent: May 27, 2008

(54) APPARATUS AND METHOD FOR TEMPORARILY COMPRESSING LOOSE, MULTIPLY BENT, PIECES OF SCRAP SHEET METAL INTO COMPACTED WAFERS

(75) Inventors: Donald R Schomisch, Oxford, MI (US); Jonathan A Little, Kalamazoo, MI (US)

(73) Assignee: Professional Management Disposal Systems L.L.C., Pontiac, MI (US)

( * ) Notice: Subject to any disclaimer, the term of this patent is extended or adjusted under 35 U.S.C. 154(b) by 151 days.

(21) Appl. No.: 11/235,627

(22) Filed: Sep. 26, 2005
(Under 37 CFR 1.47)

(65) Prior Publication Data

US 2007/0084359 A1 Apr. 19, 2007

(51) Int. Cl.
*B30B 9/32* (2006.01)
*B23P 19/00* (2006.01)

(52) U.S. Cl. ........................ 100/35; 100/102; 100/226; 100/240; 100/906; 29/238; 29/403.2; 29/403.3; 29/521; 29/524; 241/79.1; 241/DIG. 38

(58) Field of Classification Search .................. 100/35, 100/214, 215, 226, 240, 245, 906, 40, 102; 29/505, 514, 521, 524, 238, 239, 403.2, 403.3; 241/79.1, DIG. 38
See application file for complete search history.

(56) References Cited

U.S. PATENT DOCUMENTS

| | | | | |
|---|---|---|---|---|
| 2,537,920 | A * | 1/1951 | Smith | 425/556 |
| 3,039,383 | A * | 6/1962 | Windle et al. | 100/240 |
| 4,742,880 | A * | 5/1988 | Schrag et al. | 177/136 |
| 5,203,261 | A * | 4/1993 | Davis | 100/42 |
| 5,735,197 | A * | 4/1998 | Kleine | 100/127 |
| 6,497,023 | B2 * | 12/2002 | Takano et al. | 29/238 |

* cited by examiner

*Primary Examiner*—Jimmy T. Nguyen
(74) *Attorney, Agent, or Firm*—Harness, Dickey & Pierce P.L.C.

(57) ABSTRACT

The bulk volume of large numbers of loose, separated, multiply bent, irregularly shaped scrap sheet metal is temporarily reduced, for transportation and storage of the metal for recycling purposes, by compressing the metal into temporary, compacted wafers formed of successively compacted layers. The apparatus includes a load chamber which is axially aligned with a compression chamber and a reciprocating ram which passes through the chambers towards an anvil plate which closes the discharge end of the compression chamber. A pre-determined quantity of loose pieces is placed within the load chamber. The reciprocating ram compresses the pieces of that batch into a thin layer. Successive batches are compressed into overlapping layers which are temporarily bound together, face-to-face, to form a unitary wafer, by temporarily bending and intertwining the peripheral edges of the layers. The layers are subsequently separated for recycling by depositing into a melt furnace.

23 Claims, 4 Drawing Sheets

APPARATUS AND METHOD FOR TEMPORARILY COMPRESSING LOOSE, MULTIPLY BENT, PIECES OF SCRAP SHEET METAL INTO COMPACTED WAFERS

BACKGROUND OF THE INVENTION

This invention relates to an apparatus and a method for temporarily compacting multiply bent or convoluted, generally large pieces of sheet metal scrap resulting from manufacturing processes, such as sheet metal drawing procedures or sheet metal stamping processes and the like, which generate large quantities of irregularly shaped scrap pieces. Such scrap metal can be recycled by melting the scrap within conventional melt furnaces.

Typical scrap, ferrous metal trimmings from metal drawing or punching or stamping or the like processes, are multiply bent or convoluted, are irregular in shape, and are generally of substantial size. An example of such scrap pieces is the trimmings from edges of large sheets of steel whose center portions are deep drawn to form large sections of automotive vehicle bodies. Conventionally, the loose scrap metal pieces are piled into a container for transporting the scrap pieces to a place where the pieces may be stored and, ultimately, re-melted for recycling. The collected pieces, because of their convoluted or multiply bent, irregular shapes, occupy considerable volume. Thus, there is a substantial cost involved in transporting the large volume of collected pieces.

In order to reduce the volume of such collected pieces of scrap, attempts have been made to flatten their multiple bends and to compact the scrap pieces together by use of equipment which compresses the pieces together into large bales or blocks. Although this compression reduces the problems of transporting the otherwise larger volume of loose pieces, other problems result from that compression when melting the scrap. When such large bales or blocks, which can be a number of cubic feet in size, are put into a melt furnace, the length of time required for melting, and the amount of heat energy needed for melting, the compacted, dense bales or blocks, is substantially greater than that required for melting loose pieces of scrap. In general, loose pieces expose far more surface areas than a compacted block. Thus, the loose pieces of scrap are better and more quickly exposed to the heat of the furnace and to the pool of molten metal in the furnace. That results in quicker melting of the pieces. Also, conventional compression or baling equipment is relatively slow in operation and is large and expensive.

Prior attempts to reduce the volume of the scrap during transportation, and simultaneously to replace both conventional baling and transporting loose pieces of irregular, convoluted, scrap sheet metal pieces, involved flattening convoluted or multiply-bent pieces between heavy rollers. These loose, flattened pieces occupy much less volume than a random mixture of loose multiply-bent or convoluted pieces which are produced in manufacturing processes.

Another way of reducing the bulk volume of sheet metal pieces of scrap has been to utilize ram type equipment which compresses quantities of loose, multiply bent, scrap pieces directly into containers. An example of equipment which compresses scrap pieces into containers in which the compressed scrap pieces are transported, is disclosed in U.S. Pat. No. 6,418,841, issued Jul. 16, 2002, for a "System and Method for Compacting and Transporting Scrap Metal" invented by Jonathan A. Little and Donald R. Schomisch.

It would be desirable to have equipment and a method for continuously processing large, irregular, loose pieces of scrap metal to meet "mill ready" specifications (i.e. ready for melting), which eliminates some of the costly transportation and processing expenses and which would also improve the efficiency and speed of processing substantial quantities of scrap material that are continuously generated in large volume manufacturing processes.

Compacting loose pieces together into a bale or block reduces the bulk volume of the material, which reduces the expenses for transportation and storage of the scrap material. But, as set forth above, the trade-off is that such compacting increases the cost of melting the material as compared to melting loose, separate pieces. Hence, it is desirable to melt loose pieces which have more exposed surface areas as contrasted with the less exposed surface areas of compacted bales or blocks. That is, because the surface areas of the separated pieces of scrap metal are directly exposed to the heat so that they melt faster in a conventional electric arc melt furnace than when compacted into blocks which directly expose only much smaller outer surface areas to the heat.

The present invention is concerned with providing a method and apparatus which can continuously receive large quantities of irregularly shaped and multiply bent sheet metal pieces, and rapidly compress these pieces together into temporary, loosely or moderately compacted wafers or biscuits or slabs. These temporary wafers can be rapidly disassembled, after transporting them, into their constituent separate pieces when fed into a melt furnace.

The apparatus includes a ram-type press which compacts successive batches of individual, i.e. loose, sheet metal scrap pieces into layers which, in turn, are assembled together into thicker wafers or slabs. These wafers are sometimes referred to as biscuits. The individual layers and their respective pieces are temporarily held together by interlocked portions of their peripheral edges and by the interlocking of their adjacent, contacting, bent portions. The wafers, which are formed by a number of overlapped layers, can be disassembled, for example, by suspending the wafers horizontally and shaking or vibrating them so that the weight of their layers cause the layers and their constituent loosely or moderately compacted scrap pieces to pull apart and to fall down under the influence of gravity. Hence, the scrap pieces can be transported as unitary compacted groups which substantially reduce the volume during transportation, yet the pieces can later be fed into a furnace as separated loose pieces. The disassembly can be accomplished directly above a melt furnace so that separated pieces are fed into the furnace.

SUMMARY OF THE INVENTION

The invention herein contemplates a system having a load receiving chamber which is aligned with a compression chamber. Pre-determined size batches of loose scrap sheet metal pieces are dumped into the load chamber. The material is moved, by a reciprocating ram, into and through the compression chamber against an anvil plate to form compacted thin layers. The layers are overlapped, one over the other, against the anvil plate until sufficient layers are built up to form a thicker wafer or biscuit or slab. Preferably, the cross-sectional size of the ram is slightly less than cross-section of the space formed between the walls of the compression chamber.

As the ram moves through the compression chamber towards the anvil plate, portions of some of the metal pieces which form a layer, tend to extend around the periphery of the ram into the gap between the ram and the walls of the compression chamber. Those portions tend to interlock with corresponding edge portions of the next successive layer. Thus, the layers are temporarily bound together mechanically by the crinkled or bent edge portions formed during the compression movement of the ram. The layers and their constituent pieces are also temporarily connected together by the surface contacts between the bends or creases formed in the exposed surfaces of the adjacent pieces which are compressed in the layers. Thus, the successive, overlapped layers, which together make up a single wafer, are temporarily connected together along their peripheral edges and, also, at portions of their adjacent contacting surface areas.

The anvil plate, against which the ram compresses the layers, forms a sliding door that closes the exit or discharge end of the compression chamber. After a compressed wafer or biscuit is formed by compressing together a number of successive layers, the anvil plate is moved out of the way, like a door. Then the ram pushes the wafer out of the now-open discharge end of the compression chamber.

The wafers may be collected, after they are pushed out of the compression chamber, and transported in a suitable container or conveyor to a melt furnace. At the melt furnace, the wafers may be disassembled. Preferably, they are first suspended over the melt pool area of the melt furnace. The suspension may be accomplished by a crane having an electromagnetic device which magnetically attaches to the uppermost layer and holds the wafer with its layers arranged generally horizontally. The crane's magnetic holding device may be shaken or vibrated. Under the influence of gravity and the shaking, the inter-connected edges and central portions of the layers pull apart so that the layers and their pieces separate and drop downwardly into the melt pool. Thus, the pieces that form the layers tend to separately drop into the melt furnace where they melt rapidly due to their respective surfaces being directly exposed to the heat.

The density and structural integrity of the layers and of the wafers formed of the layers may be varied. Thus, the density and connections between the pieces within the compacted material can be varied by adjusting the forces applied by the ram and by adjusting the thicknesses of the layers and their wafers.

Alternatively, the wafers may be disassembled at a storage area, such as near the melt furnace, where the separated pieces may be temporarily stored. Also, if desired, the separated pieces can be further processed at that area, such as by cleaning them, or sorting them according to their metallurgical contents, etc., before they are fed into the melt furnace. Disassembly at the separate area, also can be accomplished by lifting the wafers a distance above the ground by a crane and then shaking or vibrating them and dropping them. The vibration and shaking alone, or together with the impact against the ground, will break the wafers apart and separate their constituent pieces. Then their constituent, separated pieces can be piled and later scooped up when desired.

The compacted wafers or biscuits are pushed out of the end of the compression chamber by the ram when the anvil door is opened and may fall upon a conveyor or chute and into a collection container. The container may, for example, be a large box-like device or a self-moveable device such as a truck. Thus, when the container is sufficiently full, it has to be removed and either emptied or replaced with an empty container. That would necessitate stopping the operation of the compression equipment until the full container is removed and replaced by an empty container.

To avoid the interruption in the compression process, an accumulating structure is provided to temporarily hold compressed wafers before delivering them to the container. Thus, a support ramp or platform at the compression chamber exit receives and temporarily holds a number of wafers. The wafers normally move along the ramp, and then slide down a normally downwardly inclined flap into the collection container. When a full container is to be removed and replaced with an empty container, the flap is swung upwardly, until it is tilted up into an approximately vertical position, to temporarily form a gate or closure which holds the wafers that have accumulated on the ramp from falling off the end of the ramp. When an empty container is positioned in the space below the ramp to receive wafers, the flap is swung or rotated at an angle downwardly so that wafers can again move off the ramp and slide down the slope into the container. The flap also minimizes impact forces when delivering the wafers into the container to avoid premature disassembly.

Alternatively, a relatively long ramp may be used. Such a ramp can accumulate a substantial number of wafers which are arranged vertically, that is, face-to-face and resting upon their lower edges. A crane that is arranged over the ramp can lift wafers upwardly from the ramp and move the wafers to either side of the ramp. Suitable collection containers can be located along the opposite sides of the ramp. These containers, for example, can be open top railroad cars standing upon tracks located on opposite sides of the ramp. Similarly, open top containers that can be moved by trucks can be used.

The crane can place wafers into one of the containers, until the container is loaded. Then the loaded container can be removed and replaced with an empty one. Meanwhile, the crane can load the container on the opposite side of the ramp. In that way, the formation of the compacted wafers and their removal can be a non-interrupted or continuous procedure.

An object of this invention is to provide equipment and a method which will substantially flatten and temporarily compress successive batches of loose, irregularly shaped, convoluted sheet metal into relatively thin layers which together form a compacted wafer. The layers are temporarily connected together by mechanically interlocked peripheral edge portions or by interconnecting surface irregularities of the pieces of scrap. Thus, each wafer may be transported and stored as a compact unit. The pieces which form the wafer then may be separated for insertion into a melt furnace. Thus, both the transportation costs and the costs of melting the scrap pieces are substantially reduced.

A further object of this invention is to provide equipment which can rapidly and continuously or substantially continuously receive large quantities of irregularly shaped, multiply bent pieces and which will flatten and temporarily compact the pieces into layers which, in turn, are compacted into wafers or biscuits so that the pieces may later be separated for melting in a melt furnace.

Still a further object of this invention is to reduce the time required for compacting large quantities of scrap sheet metal pieces which result from industrial metal processing, so as to enable the scrap to be easily and economically transported within temporary compacted units that can be readily disassembled for melting and recycling the separated metal pieces.

Yet another object is to provide a system for providing low cost "mill ready" scrap material, that is, material prepared for melting and recycling.

In addition, it is an object to provide compression equipment that can operate without substantial interruptions during times when the containers which receive and transport the compressed wafers are filled and, therefore, removed and replaced with empty containers.

These and other objects and advantages of this invention will become apparent upon reading the following description, of which the attached drawings form a part.

DETAILED DESCRIPTION

Figure 1:
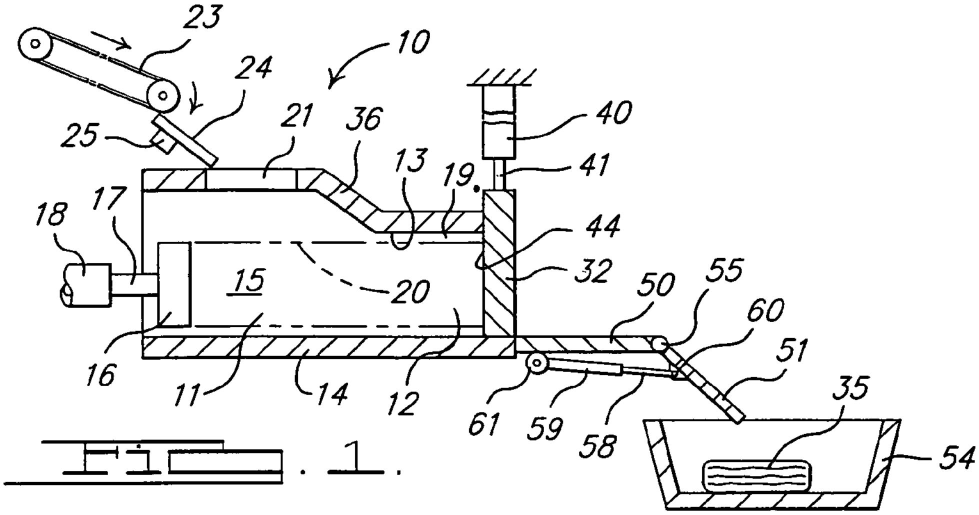
FIG. 1 is a schematic diagram of the apparatus before operation begins, with the ram shown in its withdrawn position within the load or charge chamber.

Referring to FIG. 1, the apparatus 10 comprises an elongated housing which is divided into a load collection or charge chamber 11 that opens into an axially-aligned compression chamber 12. The compression chamber may be generally rectangular or square in cross-section and has an upper wall 13, and a lower wall 14 with sidewalls 15.

A ram 16 is attached to one or more ram piston rods 17 which are powered by one or more hydraulic cylinders 18 of a suitable conventional hydraulic system (not illustrated). The ram reciprocates through the load collection chamber 11 and the compression chamber 12. FIG. 1 illustrates the ram in a withdrawn position within the load collection chamber 11.

Preferably, the cross-sectional area of the ram 16 is slightly less than the cross-sectional area of the compression chamber 12. Thus, the outer perimeter of ram 16 is slightly less than the cross-sectional periphery of the walls 13, 14 and 15 of the compression chamber. Consequently, a small gap or space 19 is provided around all, or at least part of, the peripheral edge of the ram (see dotted lines 20 in FIG. 1).

The load collection chamber 11 is provided with a load insertion opening 21 through which the scrap pieces may be dropped.

Figure 2:
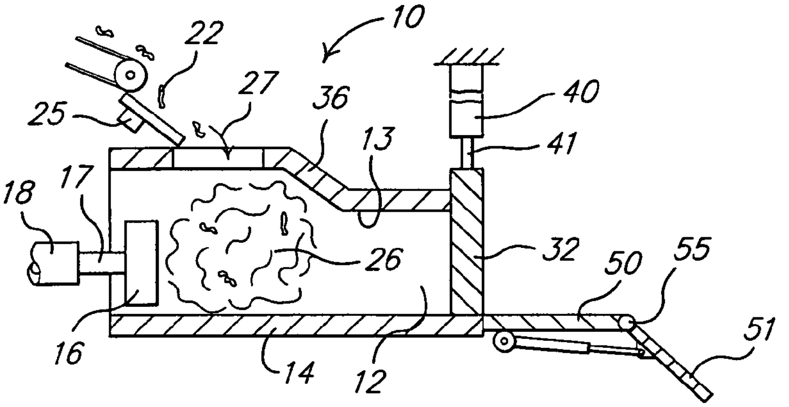
FIG. 2 is a schematic diagram similar to FIG. 1 showing the step of loading a batch of scrap metal pieces into the load or charge chamber.

Loose, separate, scrap metal pieces 22 (see FIG. 2) which are irregular in size and shape, and contorted or multiply-bent, are carried by a conveyor 23, or other suitable feed mechanism to the opening 21. Preferably, the scrap pieces are dropped upon a divertor or a chute 24 which discharges into the load chamber opening 21. A conventional mechanical vibrator 25 (schematically shown) may be attached to the chute 24 to expedite movement of the pieces 22 into the opening 21.

A pre-determined size batch 26 of scrap pieces is loaded into the load chamber (see FIG. 2), as indicated by the arrows 27.

Figure 3A:
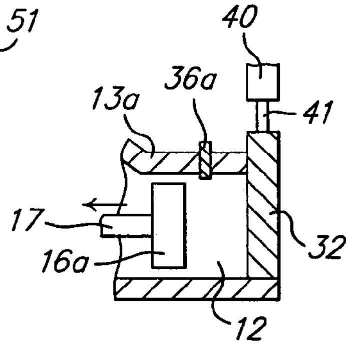
FIG. 3*a* is a schematic view of a modification wherein the upper walls defining the load and compression chambers are substantially co-planar.
Figure 3:
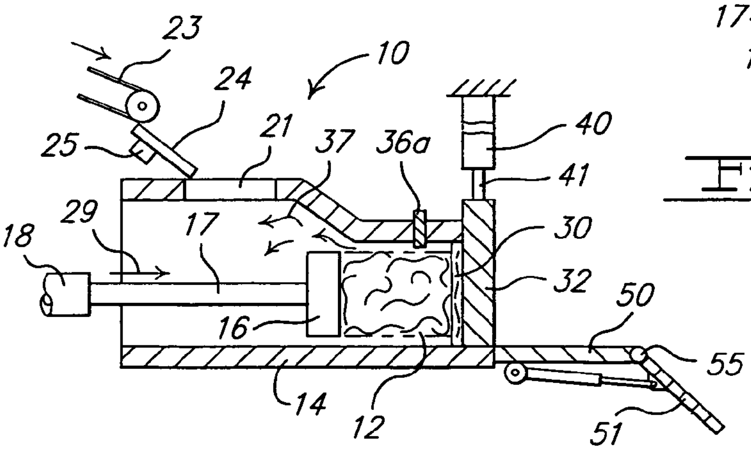
FIG. 3 is a schematic view similar to FIG. 1 illustrating the ram compressing the scrap metal pieces into the compression chamber to form a compressed layer against the anvil plate.
Figure 4:
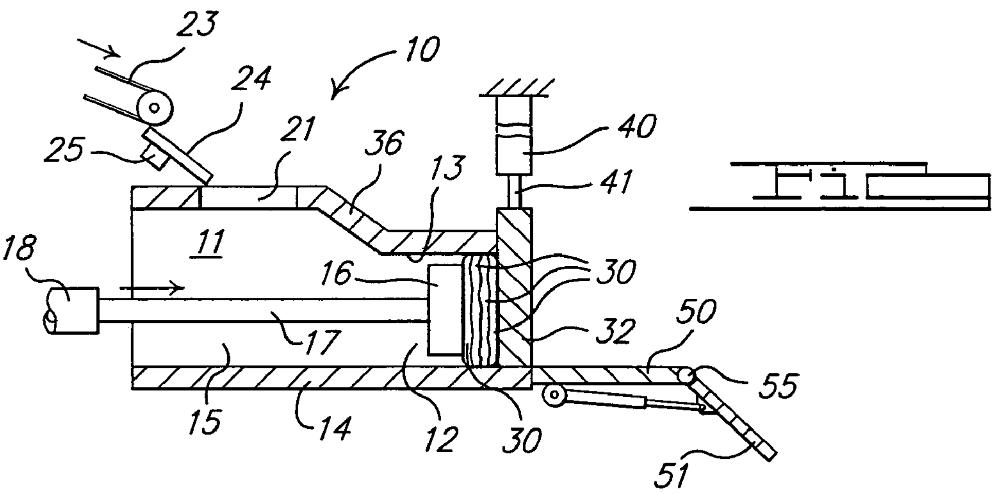
FIG. 4 is a schematic diagram illustrating the ram after compressing a series of layers, that is, after repeating the series of steps illustrated in FIGS. 1, 2 and 3, to compact a number of successive batches of scrap pieces into compacted layers with each layer overlapping its preceding layer.
Figure 10:
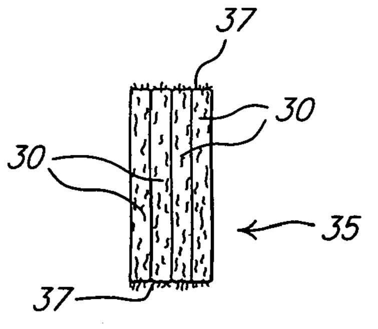
FIG. 10 schematically illustrates a wafer formed of a number of layers whose adjacent faces are interconnected and whose bent or crinkled edge portions are intertwined to connect the peripheral edges of adjacent layers.

The batch 26 of loose, contorted, multiply bent, irregularly shaped scrap pieces is pushed into the compression chamber 12 by the ram 16 (see FIG. 3) as indicated by the arrow 29 to form a compressed layer 30 in the compression chamber. The ram pushes the pieces against an anvil-plate 32 which forms a door. The ram is then withdrawn back into the load chamber 11 and the load and compression steps are repeated to build up a series of multiple, overlapped layers 30 (see FIG. 4). The number of overlapped layers may vary. At least some or all of the peripheral edges of the overlapped, adjacent layers are mechanically interlocked to form a completed wafer 35 (see FIGS. 5, 10). Also, the bends and irregularities in the surfaces of, and the irregularly shaped edges of, the adjacent, contacting faces of the adjacent layers further interconnect the adjacent layers.

Figure 9:
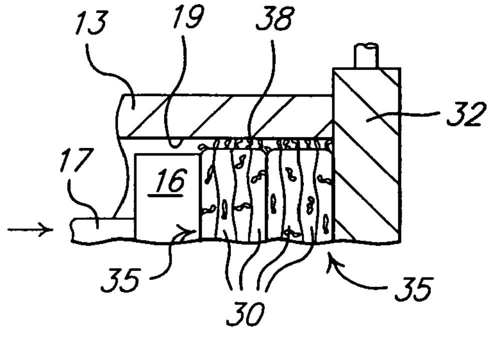
FIG. 9 is an enlarged, fragmentary, schematic view of edge portions of a pair of adjacent layers bending into the gap between the peripheral edge of the ram and the surface of the wall of the compression chamber and, also, the ram compressing another layer against a preceding layer.

The load collection chamber 11 is preferably formed with an interior cross-sectional size which is larger, particularly in the vertical direction, than the compression chamber. Thus, the intersection between the upper wall 13 of the compression chamber and load chambers is provided with a sloped diverter wall 36 or with a series of closely spaced rods or plates that form a sloped diverter wall. The wall may be angled, for example, at about a 45 degree angle, although the angle may be varied. The diverter allows some uncompressed scrap pieces (see arrows 37, FIG. 3), to move around the ram back to the collection chamber when the ram moves through the compression chamber (see FIG. 9). Alternatively, the upper wall of the load chamber and the upper wall 13 of the compression chamber may be substantially co-planar (not shown). A scraper 36*a* may be arranged on the wall 13*a*, extending transversely of the compression chamber to hold back any loose pieces which might otherwise tend to move back to the load chamber when the ram 16*a* is retracted (see FIG. 3*a*).

Figure 6:
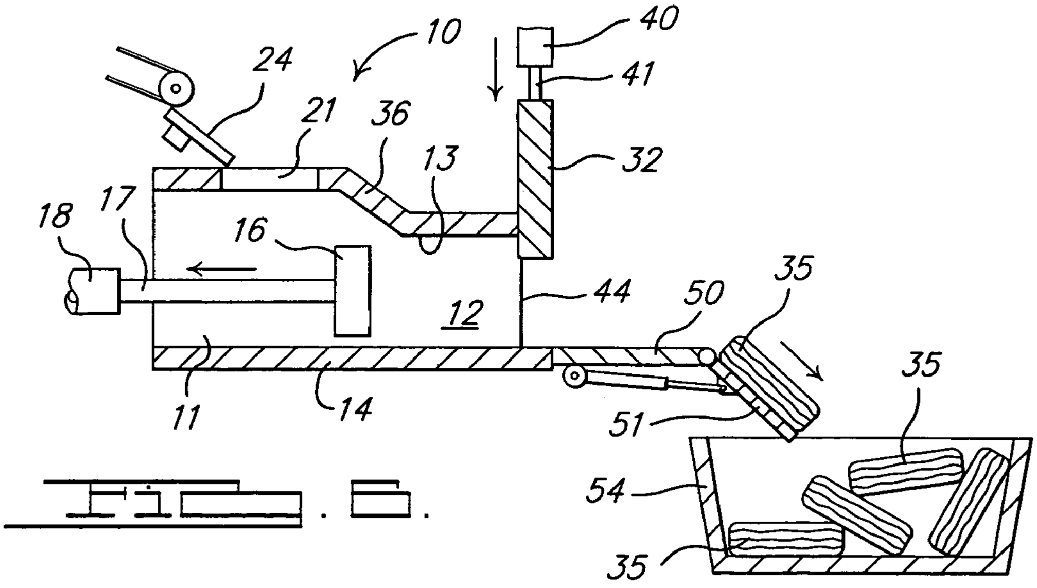
FIG. 6 schematically illustrates the retraction of the ram out of the compression chamber, and the anvil/door moving down to close the discharge opening of the compression chamber. Schematically, the discharged wafer or biscuit is illustrated as sliding down an inclined flap, after moving along the holding ramp, into a transportation container.
Figure 7:
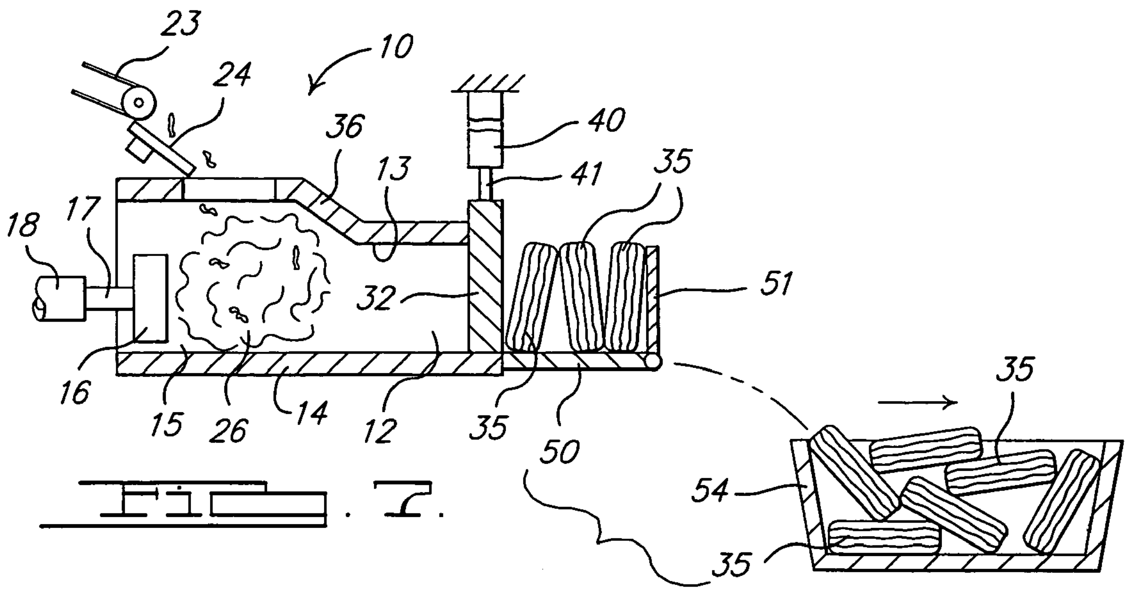
FIG. 7 schematically illustrates the accumulation of wafers on the temporary holding ramp, with the flap pivoted upwardly to hold the wafers on the ramp while a filled container is being removed for replacement by an empty container.

The exit or discharge end of the compression chamber is normally closed by the anvil plate or door 32 against which the scrap metal pieces are compressed. The anvil plate or door is provided with at least one hydraulic cylinder 40 which operates lift rods 41 that are attached to door 32 for lifting the door up (see FIG. 5) and then moving it downwardly (see FIGS. 6, 7) for closing the discharge opening 44 of the compression chamber. The opening 44 provides an exit through which a completed wafer 35, formed of a number of layers 30 of flattened, compressed scrap metal pieces, is discharged from the compression chamber 12.

As each batch of loose, multiply bent, pieces of scrap metal is pushed towards the anvil plate 32 by the ram 16, there is a tendency for portions of some of those pieces, to extend into the gap 19 between the edges of the ram and the walls of the compression chamber. Those portions tend to bend or crinkle, thus forming the irregularly bent, outwardly extending edge portions 38 on the periphery of each of the layers (see FIG. 9).

The extending bent edge parts 38 of the pieces tend to intertwine and connect with the extending edge portions of adjacent pieces during the ramming movement and during compression. The bent edge portions 38 of the pieces mechanically interlock with each other within their own particular layers and with the edge portions of adjacent layers. Thus, the peripheral edges of the layers are interlocked or bound together by the mechanical intertwining or interlocking of the bent edge portions that are formed on the peripheral edge of each of the layers. The layers are also connected to each other, face-to-face, by the pressurized engagement of bent portions or irregularities in their adjacent surfaces. Hence, the adjacent layers are compacted together to form wafers or biscuits.

Figure 5:
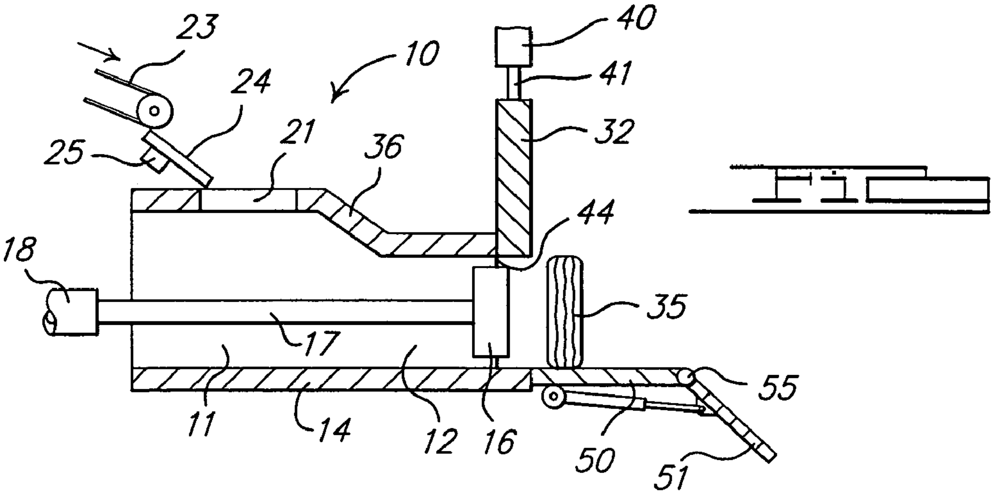
FIG. 5 illustrates the removal of the anvil/door plate and the ram pushing a completed wafer, formed of a number of layers, out of the discharge opening of the compression chamber.

Upon completion of a wafer following the repeated reciprocation and compression action of the ram to form the successive batches of scrap pieces into the layers that overlap and are mechanically interconnected, the door 32 is opened, by raising it (see FIG. 5). Then the forward movement of the ram that follows the last of the overlapped layers which forms a complete wafer or biscuit 35, pushes the completed wafer through the compression chamber's discharge opening 44. The wafer 35 may move to a holding ramp or platform 50 where it is temporarily held until it moves further. At the end of the ramp the wafer drops or slides down along flap 51 into a suitable removal container 54 (see FIG. 6). The container may be a large moveable receptacle which can receive a number of wafers or it may be part of a vehicle, such as a truck body or railroad car or the like, or it may be a suitable conveyor for transporting the wafers.

After the completed wafers fill the removal container, the container can be transported to a recycling site for melting in a conventional melt furnace.

When a removal container is filled, it must be replaced by an empty container. This takes some time to move the filled container away from its position at the discharge end of the compression chamber and to move an empty container into that position. To limit that time or to avoid lengthy stoppage of the equipment and to permit a substantially continued flow of scrap pieces from the scrap-generating source into the compression equipment, a wafer-holding and accumulating system is provided.

As illustrated in FIG. 5, when a wafer is pushed out of the compression chamber by the ram, it rests on the ramp or platform 50 until it slides along the ramp to the downwardly inclined flap 51. Then the wafer slides down the flap into the removal container 54 (see FIGS. 6, 7). Meanwhile the anvil/door 32 is moved downwardly to close the discharge opening 44 so that the ram may continue its reciprocating and compressing cycles (see FIG. 7).

Figure 8:
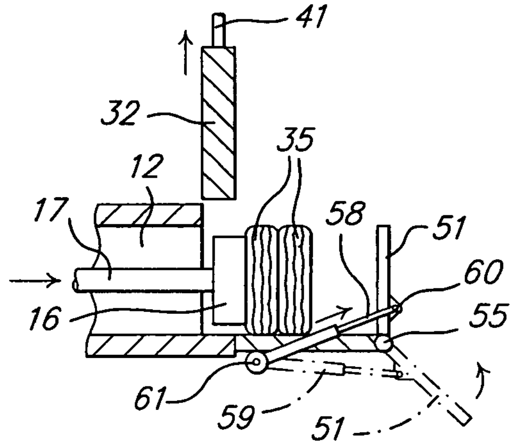
FIG. 8, schematically illustrates the swinging of the flap into an upward position for temporarily retaining wafers that are accumulating on the discharge or holding ramp.

When the container 54 is filled and ready to be moved for replacement, the flap 51 is pivoted or swung upwardly, around a hinge-like pivot joint 55, into an upright position which may be roughly vertical or somewhat angled relative to the vertical (see FIG. 8). The wafers 35 accumulate on the ramp and are retained on the ramp by the upright flap (see FIG. 7). Thus, the ram reciprocation and the compression of the scrap pieces continues.

After an empty container is arranged in position to receive wafers, the flap is swung into its downwardly sloped position so that the wafers again slide down the flap into the container 54. To assist the movement of the wafers along the ramp and the flap, a commercially available vibrator may be attached on the ramp 50 or flap 51.

The flap 51 is swung upwardly and held upright and reversibly held downwardly at an angle by one or more conventional hydraulically operated piston rods 58 attached to pistons moved within hydraulic cylinders 59. As schematically shown (see FIG. 8), the piston rods 58 are pivotably connected to the flap at 60. The hydraulic cylinders 59 are pivotably connected at 61 to the ramp or other suitable portion of the equipment. Outward movement of the piston rod, by pressurized fluid applied to the piston arranged in the cylinders, moves the flap upwardly or downwardly. Conventional controls (not shown) are used to control the outward or inward movement of the piston rods for swinging the flap upwardly or downwardly.

Figure 12:
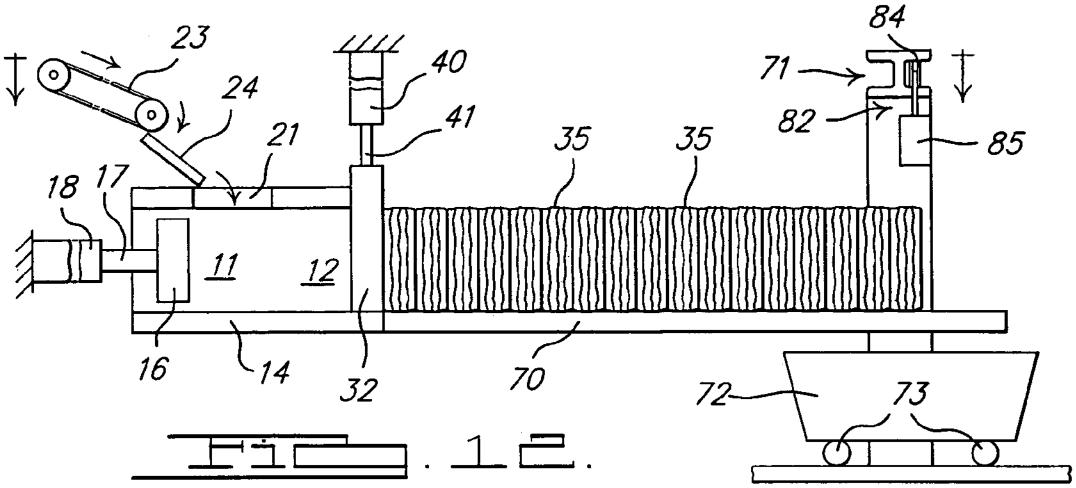
FIG. 12 schematically illustrates a front elevational view of a second embodiment in which the wafer removal system has a relatively large wafer holding capacity and can load completed wafers into containers positioned on opposite sides of the holding ramp.
Figure 13:
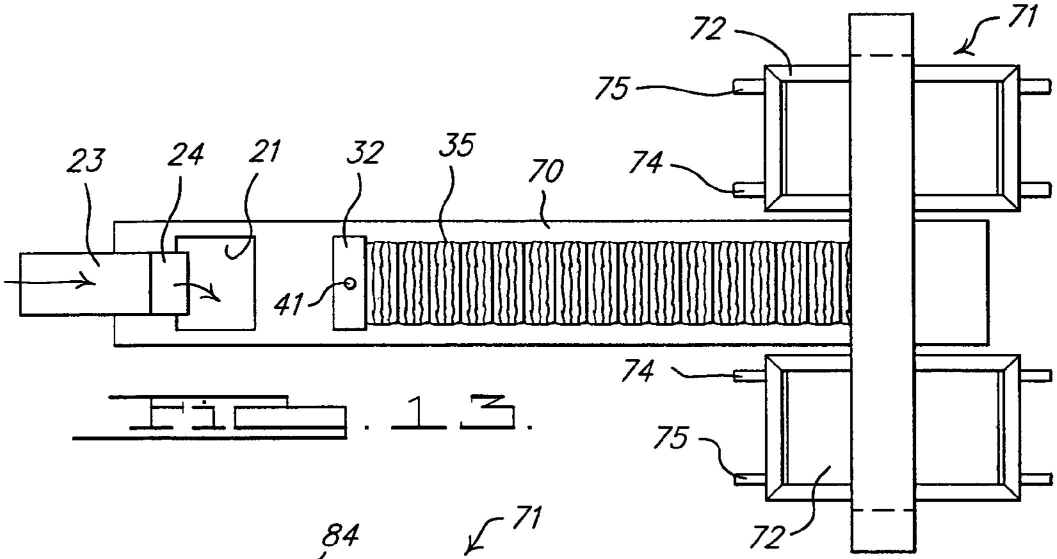
FIG. 13 schematically illustrates a top plan view, taken in the direction of arrows 13-13, of the embodiment of FIG. 12.
Figure 14:
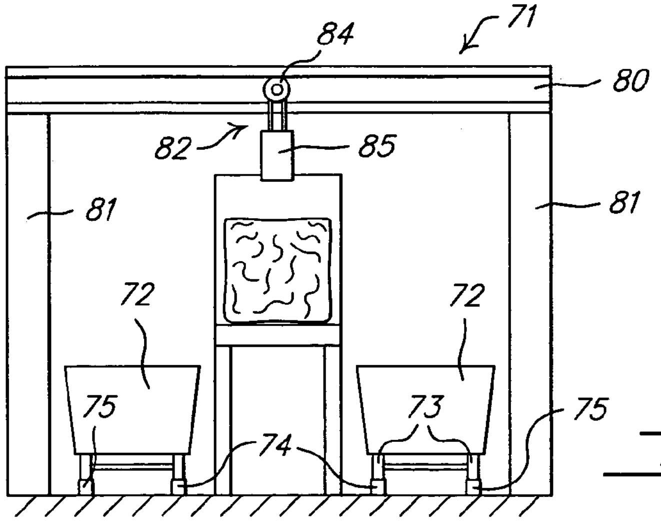
FIG. 14 schematically illustrates a rear end view of the embodiment illustrated in FIG. 12.

FIGS. 12-13 schematically illustrate a second embodiment for collecting and removing wafers that are discharged from the compression chamber. The holding ramp or platform 70 is considerably lengthened so as to hold a large number of wafers 35. A cross-bridge crane 71 spans the ramp and unloads wafers into containers located on either side of the ramp.

As an example, the container 72 may be open top railroad cars having wheels 73 positioned upon tracks 74 and 75 located alongside the ramp. Thus, a car on one side of the ramp may be loaded first, and then while the loaded car is removed and replaced with an empty car, the car on the opposite side may be loaded.

The bridge crane 71 is conventional and generally comprises an overhead beam 80 extending laterally over the ramp and supported upon side beams 81. A conventional lift assembly 82 is carried by the overhead beam and is movable along the length of the beam into positions over either of the cars or over the ramp. The lift assembly includes a suitable, conventional electromagnetic or mechanical gripper 85 (shown schematically) which can be lowered to grasp a wafer, and then raised for moving the wafer to one side or the other of the ramp. The grip assembly is supported upon one or more rollers 84 that enable the grip assembly to be moved along the beam. The lift assembly may be lowered sufficiently to release the wafer into the respective car. As mentioned, the particular lift assembly grippers may be selected by those skilled in the art from conventional electromagnets or from mechanical grip arms which grip a wafer between them. Suitable cranes for this purpose are known and are commercially available. The selected crane must be of sufficient size and must have enough lift capacity and an operating and control mechanism for handling predetermined size and weight wafers. As an example, a wafer may weigh roughly 3,000 pounds, so that the crane would have to be capable of rapidly gripping, lifting and quickly moving that wafer over, and then lowering and releasing it into the containers.

Figure 11:
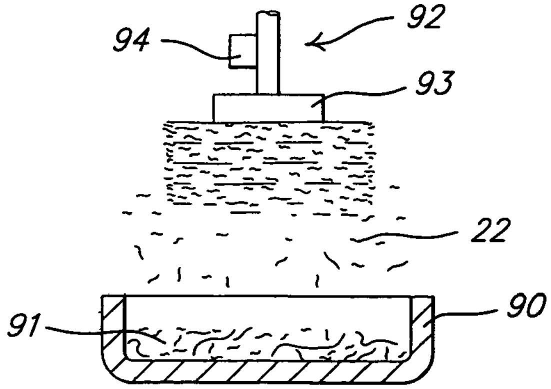
FIG. 11 is a schematic, reduced size, diagrammatic view showing the vibration or gravity-induced disassembly of a wafer over the molten metal pool of a melt furnace.

As illustrated schematically in FIG. 11, the wafers are transported to, and dumped into the melt furnace 90 to melt the pieces of scrap metal. The wafers 35 are disassembled into their constituent separate pieces 22 when dropped into the furnace. When the pieces are melted, the liquid melt 91 is discharged from a furnace opening (not shown). The molten metal 91 is then solidified and recycled in conventional manners.

The wafers 35 are preferably picked up by a conventional crane 92 (see FIG. 11) which has an electromagnet 93 that magnetically attaches to the surface of the uppermost layer of a wafer. The wafer may be held substantially horizontally. Typically, the scrap material is formed of a magnetically-attractable ferrous metal, as for example, a steel or steel alloy which is commonly used in the manufacture of metal objects such as automotive body parts. When the wafer is held in a generally horizontal position above the melt furnace, the crane's magnetic holding device may be shaken or vibrated by a conventional vibrator 94 which is schematically illustrated. The heavy weight of the layers located below the uppermost layer, and the shaking or vibration causes the layers and their respective scrap pieces to separate and to drop downwardly due to the gravitational and shaking forces. The layers and their constituent pieces tend to disconnect and to buckle or sag relative to each other so as to overcome their interlocked connections. Thus, the layers separate from each other. Similarly, the individual metal pieces, which are held together within each layer, separate from each other. Hence, each wafer substantially disassembles into loose, separated, flattened, pieces of metal at the time the wafer is loaded into the melt furnace.

The disassembled load may be dropped directly into the furnace, as indicated above, or may be dropped upon a furnace feed apparatus, such as a conveyor, which feeds scrap into the furnace. Alternatively, the wafers may be disassembled by lifting them up and vibrating or dropping them directly upon the ground, for example, in an area near the melt furnace. The force of the impact tends to separate the pieces. The separated pieces may be piled for storage and for later loading them into the furnace or the pieces may be otherwise processed such as by cleaning and sorting them.

When the separated pieces are dropped into the furnace, their surfaces are immediately exposed to the heat. That results in a more rapid melting of the pieces than would otherwise occur in a compacted block formed of such pieces.

The size and speed of operation of the apparatus may be caused to vary, depending upon the quantity or nature of the scrap to be processed at any particular location. As an example of a preferred embodiment, it is contemplated that the collection chamber would be on the order of about 5 feet wide by 7 feet long and 3 feet tall. The compression chamber would be slightly smaller. The ram would have an area slightly smaller than the cross-sectional area of the compression chamber. Thus, the ram would be sized to closely or slidably fit within the compression chamber. A slight gap or space such as on the order of, for example, about one to about one-quarter of an inch may be arranged between the peripheral edge of the ram and the walls defining the compression chamber.

The ram may be reciprocated through the two chambers rapidly, as for example, at about 150 seconds per four cycles of compression and withdrawal movements of the ram. That would provide four layers for a wafer. The batch size, i.e. the number or the volume of the scrap pieces in a batch, can be varied depending upon the material, the metal thickness, and the depth and sizes of the bends or convolutions.

Each batch of scrap is dropped into the opening of the collection chamber when the ram is withdrawn on its retraction stroke. For example, roughly a total of 25-30 tons per hour of scrap material may be dropped into the chamber on a batch basis. Using an example of 4 layers per wafer, and a thrust of 450,000-475,000 pounds force on the face of the ram, the rapid compressive movement of the ram during each cycle will process a greater amount of scrap within a shorter period of time than compression equipment currently used for baling or flattening.

The wafer output, for example, depending upon the speed of the loading and compression steps, can run between about five tons to 30 or more tons per hour. Thus, large quantities of scrap trimmings can be rapidly processed.

The density and size of the wafers, which relate to their weights, may be varied by adjusting the speed and force of the ram, and the number of compression cycles of the ram for each wafer. The best wafer weights, for transportation and handling purposes, can be empirically determined for different size, thicknesses, and types of metal scrap pieces. Similarly, suitable density of a wafer, that is, compactness, can be pre-determined by trial for best results in separating the pieces before melting them. The degree of compaction or density is related to the use of sufficient ram pressure to temporarily hold the pieces and their layers together long enough to transport the wafers and yet, to later release the pieces and their layers for disassembling the wafers for facilitating the melting of the metal. That condition varies with the metal thickness, sizes, compressive forces, etc. and, therefore, should be determined empirically by trial.

In a typical, large, sheet metal processing operation, the scrap metal trimmings from the edges or interiors of objects formed from the drawing and trimming operations, are convoluted or multiply bent, irregular in shape, and although relatively thin, have a memory of the bends formed in the scrap sheet. The ram must flatten the bends sufficiently to substantially overcome the memory of the bends in the sheet. Thus, the nature of the metal material and of the bends in the scrap pieces will influence the amount of force that is required to flatten the bends. Also, since the wafers must be transported, the weights of the wafers must be considered based upon the nature of the equipment available for transporting or supporting the wafers. For example, wafers weighing about 1,800 to roughly 3,000 pounds are relatively easy to transport with typical transfer containers, railroad cars, conveyors, or trucks. The equipment described above is easily adaptable to changes in the quantity and nature of the scrap material to be processed and, also, to weight restrictions on the wafers as may be needed.

Significantly, the increased exposed surface areas of the disassembled layers, and of the scrap pieces from the layers, substantially reduce the amount of time and heat needed for melting the scrap into the molten form as compared with baled or large compressed masses of scrap. Hence, the costs involved in recycling such scrap is substantially reduced.

This invention may be further developed within the scope of the following claims. Accordingly, the foregoing description should be read as merely descriptive of an operative, preferred embodiment of this invention and not in a strictly limiting sense.

What is claimed is:

1. A method for reducing bulk volume in numerous, separated, loose pieces of irregularly-shaped, multiply bent, thin scrap sheet metal comprising repeated cycles of the steps of:

assembling a batch of said loose pieces;

forcibly ramming the batch into and through a compression chamber against an anvil plate with a reciprocating ram that is closely fitted within walls defining the compression chamber;

the ram having a peripheral edge and maintaining at least portions of said peripheral edge at a pre-determined distance from said walls to form a slight gap between portions of the peripheral edge of the ram and said walls as the ram moves through the chamber towards the anvil plate to form a compacted wafer of flattened, compressed layers from said loose pieces;

bending peripheral edge portions of successive compressed layers into and within said gap and interconnecting some of the bent edge portions of adjacent layers for temporarily interlocking the successive layers at their adjacent edge portions;

withdrawing the ram from the compression chamber to provide a space adjacent the compression chamber for assembling the next successive batch of loose pieces;

repeating the cycle to form the successive layers of batches into a compacted wafer formed of overlapping layers;

removing the compacted wafer from the compression chamber for subsequently recycling the metal of the wafer by disassembling the compacted wafer by separating the layers from each other and by separating the loose pieces contained in each of the layers.

2. A method as defined in claim 1, and compressing together bent portions of contacting surfaces of adjacent layers when the batch is rammed against said anvil plate, for interconnecting adjacent layers to form the compacted wafer.

3. A method as defined in claim 2, and including transporting the compressed wafer to a melt furnace having an entry opening into the furnace;

holding the wafer at a location between its peripheral edges, above the entry;

whereby the layers and their component pieces are caused to separate from the wafer by vibration or gravity, and drop down the entry for feeding the pieces, into the furnace for melting the separated metal pieces.

4. A method as defined in claim 3, and said wafers being formed of layers of magnetically attractable ferrous material, and holding the wafer, with the layers forming said wafer being substantially horizontally oriented, by a magnetic type transfer device which is engaged with the upper surface of the horizontally oriented layer to support the wafer above said furnace entry with the force of gravity tending to separate the layers, and their constituent pieces, from the wafer.

5. A method for reducing bulk volume in large quantities of loose, irregularly shaped, multiply bent, thin, sheet metal pieces, comprising the steps of:

collecting together a batch of said pieces and forcibly compressing said batch against an anvil plate by a reciprocating ram moving the pieces towards and against the anvil plate to flatten the pieces and to compact the pieces into a layer;

repeating the step of collecting batches of loose pieces and successively compressing them towards the anvil plate against preceding layers to form a series of overlapped compressed layers, each formed of a number of pieces compacted together;

bending peripheral edge portions of the layers into interlocking relationship with portions of successive layers for temporarily connecting adjacent layers together, along the peripheral edges thereof, into a unitary compressed wafer, so that the wafer is formed of separate compressed layers connected together along the peripheral edges thereof and are connected together at adjacent contacting surface portions between their peripheral edges;

repeating the foregoing steps to form successive wafers, an overall volume of which is substantially less than the volume occupied by the loose, pre-assembled pieces;

transporting the wafers as units, and separating the layers forming each of said wafers and pieces forming the layers into loose pieces when desired.

6. A method as defined in claim 5, and including separating the layers and the pieces thereof by holding the wafers with the layers arranged generally horizontally so that the layers and their pieces separate and drop downwardly away from each other under the influence of gravity.

7. A method as defined in claim 5, including a step of removing the anvil following the completion of a wafer formed of the successive layers compressed against the anvil, so that the compressed wafer may pass the anvil and move into a conveyance for transporting the wafer.

8. A method as defined in claim 5, and with said pieces being formed of a magnetically-attractable, ferrous material;

and magnetically engaging and holding each assembled wafer, with its layers arranged generally horizontally, at a location on the uppermost exposed layer between the peripheral edges of the layers, for gravity-induced disassembly of the layers and their separate pieces.

9. A method as defined in claim 5, and disassembling the wafer by holding the wafer so that its layers are generally horizontally arranged, wherein the connections between the adjacent wafers and between the pieces forming the layers are overcome by the forces of vibration or gravity and the layers drop downwardly from the wafer and the individual pieces forming each layer separate, so that the separated pieces may be placed into a furnace for melting and recycling the metal.

10. A method as defined in claim 9, and including holding the wafer, by a magnetic device engaged with and magnetically connected to the uppermost layer with its layers arranged substantially horizontally, for the disassembly of the layers.

11. A method as defined in claim 5, and including removing the anvil plate upon completion of each wafer and moving the completed wafers past the anvil plate for further movement into a container for transporting the wafers to a location where the wafers may be disassembled into their constituent loose pieces for melting the pieces.

12. A method as defined in claim 11, and including normally discharging a number of wafers immediately following their passing the anvil plate into transportation containers and temporarily holding and accumulating a number of discharged wafers before discharging said wafers into containers while continuing forming wafers during times when removing filled and replacing empty containers.

13. An apparatus for temporarily reducing bulk volume in a large quantity of separate, loose, thin, multiply bent, irregularly shaped pieces of scrap sheet metal, comprising:

a load chamber into which batches of a quantity of said loose pieces may be placed, with the load chamber opening into a compression chamber having peripheral walls and a discharge opening closed by an anvil plate remotely located relative to the load chamber;

a reciprocating ram normally arranged within the load chamber at a starting position remote from the opening between the load chamber and compression chamber, with the ram being reciprocally movable through the load chamber and into and out of the compression chamber towards and away from the anvil plate for compressing successive batches into overlapped layers, which are temporarily interconnected to form unitary wafers;

said ram being closely fitted within the walls defining the compression chamber but having its peripheral edge spaced a short distance from said walls to provide a gap between at least portions of the peripheral edge of the ram and the walls when the ram is reciprocated within the compression chamber, so that peripheral edge portions of the layers may enter the gap and intertwine to connect adjacent layers;

whereby successive batches of loose pieces positioned within the load chamber are moved through the compression chamber towards the anvil plate for compressing each batch into a layer, with successive batches forming successive overlapped layers until a pre-determined number of layers form a complete compressed, temporary unitary wafer, with at least some of the portions defining the peripheral edges of the layers being fitted within said gap between the ram peripheral edge and the walls defining the compression chamber and being bent into interlocking relationship with similar portions of adjacent layers for temporarily mechanically interlocking and, thereby binding, the overlapped layers to each other in the wafer formation and, portions of contacting surfaces of adjacent layers temporarily bind together;

said anvil plate being moveable to open the discharge opening of the compression chamber when a wafer is completed, so that the ram pushes the completed wafer through the discharge opening out of the compression chamber for collecting and transporting the wafers to a remote location where the wafers may be disassembled into their constituent loose pieces; and a lifting device for suspending and holding the uppermost, exposed layer of the completed wafer in a position in which the layers of the wafer are generally horizontally arranged, so that forces of gravity and vibration and the weight of the layers cause the layers to separate and drop downwardly, and substantially separating the loose pieces forming each of the layers, so that the pieces may be separately processed within a melt furnace for recycling the metal.

14. An apparatus as defined in claim 13, and including a ramp located at said discharge opening for accumulating a number of wafers, and said ramp having an end flap pivotally connected thereto for normally sloping downwardly for depositing wafers from the platform into a transportation container, but pivot upwardly for temporarily retaining a number of wafers on the platform during replacement of filled containers.

15. An apparatus as defined in claim 13, wherein said loose metal pieces being formed of a ferrous, magnetically attractable material, and said lifting device including an electromagnet which engages and is magnetically connected to the uppermost layer between the peripheral edges of said uppermost layer, so that the layers may drop downwardly under the influences of vibration and gravity, pulling free of their interconnected portions for separating the layers and their respective pieces.

16. A method for reducing bulk volume in large quantities of pieces of loose, irregularly shaped, multiply bent, thin, sheet metal pieces, comprising the steps of:

collecting together a batch of said pieces and forcibly compressing said batch against an anvil plate by a reciprocating ram moving the pieces towards the anvil plate to flatten the pieces and to compact the pieces into a layer;

repeating the step of collecting batches of loose pieces and successively compressing them towards the anvil plate against preceding layers to form a series of overlapped compressed layers, each formed of a number of pieces compacted together;

compressing adjacent faces of adjacent layers together into interlocking relationships for binding the layers together face-to-face into a temporary, compressed wafer, so that the wafer is formed of a number of separate compressed layers that are temporarily bound together along portions of the peripheral edges thereof as well as at portions of their adjacent contacting surfaces;

and repeating the foregoing cycle to form a successive group of such wafers, the overall volume of which is substantially less than the volume occupied by the loose, pre-assembled pieces;

transporting assembled wafers to a pre-determined location remote from the location where they are formed and then dissembling the layers, and the pieces forming the layers for melting separated pieces in a furnace.

17. A method as defined in claim 16, and including transporting the compressed wafer to a melt furnace having an entry opening into the furnace;

disassembling the wafer into its constituent pieces and dropping the pieces into the furnace opening to increase the speed of melting and decrease the amount of heat required for melting the metal in the furnace for recycling the metal.

18. A method as defined in claim 17, including the step of removing the anvil following the completion of a wafer formed of the successive layers compressed against the anvil, and moving the compressed wafer past the anvil upon a plafform for temporarily accumulating completed wafers and discharging the wafers into a conveyance for transporting the wafer to the furnace.

19. A method as defined in claim 16 and including collecting a number of compressed wafers upon an elongated platform as they are formed, and lifting the wafers up, off the platform, and downwardly into removable containers temporarily located along opposite sides of the platform for transportation of the wafers.

20. A method for transporting large quantities or irregularly shaped, multiply bent, thin, scrap sheet metal pieces for recycling the metal, comprising:

collecting a batch of said pieces and forcibly compressing the pieces together to substantially flatten each piece and to form a loose, but compacted together, layer of interconnected compressed pieces;

repeating the step of collecting and compressing a pre-determined number of successive batches to form successive layers, with the compression of each successive batch being performed against and in contact with its preceding compressed layer so as to loosely bind each of the layers to their respective adjacent layers to form a temporary wafer comprised of loosely interconnected layers each formed of interconnected, compacted and generally flattened pieces;

transporting said wafer to a pre-determined location for melting the pieces for recycling the metal;

disassembling the temporary wafers by separating the layers from each other and by separating the pieces contained in each layer at said location by applying a force to the wafer at said location sufficient to overcome the connections between, and to substantially disconnect the layers and their respective pieces from each other.

21. A method as defined in claim 19 and including suspending the wafer above the location and applying the force of gravity and applying a vibration force upon the wafer for implementing the disassembly thereof.

22. A method as defined in claim 20 and including suspending the wafer above said location and then, dropping it under gravitational force upon a solid surface to thereby provide a sufficient impact to overcome the connections between the constituent layers and pieces forming the wafer so as to separate the layers and their pieces.

23. A method as defined in claim 20 and holding the wafer with an electromagnet at a distance above said location while applying vibrational forces to the wafer, so that the layers and their constituent pieces disconnect from each other and drop under the force of gravity upon said location.

* * * * *